(12) United States Patent
Jamiołkowski et al.

(10) Patent No.: US 11,927,137 B2
(45) Date of Patent: Mar. 12, 2024

(54) SYSTEM AND METHOD FOR INSULATING COMPONENTS IN AN EXHAUST GAS FLOW FROM A GAS TURBINE

(71) Applicant: General Electric Company, Schenectady, NY (US)

(72) Inventors: Robert Jamiołkowski, Łapy (PL); Damian Wolff, Wels (AT); Adam Wiśniewski, Pruszków (PL)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/877,809

(22) Filed: Jul. 29, 2022

(65) Prior Publication Data
US 2023/0296055 A1  Sep. 21, 2023

(51) Int. Cl.
*F02C 7/24* (2006.01)
*F01D 25/14* (2006.01)

(52) U.S. Cl.
CPC .............. *F02C 7/24* (2013.01); *F01D 25/145* (2013.01); *F05D 2220/32* (2013.01); *F05D 2230/642* (2013.01); *F05D 2240/128* (2013.01); *F05D 2260/231* (2013.01); *F05D 2260/30* (2013.01)

(58) Field of Classification Search
CPC ...... F01D 25/145; F01D 25/162; F01D 9/041; F01D 9/065; B64C 1/403; F02C 7/24; F05D 2260/231
See application file for complete search history.

(56) References Cited

U.S. PATENT DOCUMENTS

| | | | |
|---|---|---|---|
| 2,845,249 A * | 7/1958 | Taylor | F01D 25/30 415/177 |
| 5,378,026 A | 1/1995 | Ninacs et al. | |
| 8,083,465 B2 | 12/2011 | Herbst et al. | |
| 9,732,674 B2 | 8/2017 | Sakamoto et al. | |
| 9,890,740 B2 * | 2/2018 | Matsuyama | F02K 1/822 |
| 10,494,116 B2 * | 12/2019 | Petty, Sr. | B64D 33/04 |
| 2009/0226663 A1 * | 9/2009 | Hutter, III | F16B 37/048 428/99 |
| 2010/0316491 A1 * | 12/2010 | Yamashita | F01D 25/30 415/177 |
| 2011/0110771 A1 * | 5/2011 | Morgan | F01D 5/147 415/177 |
| 2013/0091864 A1 * | 4/2013 | Auzelyte | F23J 13/08 29/888.021 |

(Continued)

OTHER PUBLICATIONS

European extended search report for EP Application No. 23159576.0 dated Jun. 12, 2023; 11 pgs.

*Primary Examiner* — Topaz L. Elliott
(74) *Attorney, Agent, or Firm* — Fletcher Yoder, P.C.

(57) ABSTRACT

A system may include an insulation mount assembly configured to mount insulation within a component of an exhaust diffuser of a combustion system. The insulation mount assembly includes an insulation cover plate configured to cover the insulation over a wall of the component, and a plurality of mounting clips configured to extend partially over the insulation plate and couple to the wall of the component. Each clip of the plurality of mounting clips is configured to enable movement of the insulation cover plate in a first direction along a surface of the wall and block movement of the insulation cover plate in a second direction crosswise to the surface of the wall.

20 Claims, 8 Drawing Sheets

(56) References Cited

U.S. PATENT DOCUMENTS

| | | | |
|---|---|---|---|
| 2014/0286763 A1* | 9/2014 | Munshi | F01D 25/12 |
| | | | 415/178 |
| 2015/0300396 A1* | 10/2015 | Balderrama | B64C 1/403 |
| | | | 411/373 |
| 2015/0337682 A1 | 11/2015 | Yeager et al. | |
| 2015/0354410 A1 | 12/2015 | Budnick et al. | |
| 2016/0003193 A1* | 1/2016 | Matsuyama | F02K 1/822 |
| | | | 138/149 |
| 2017/0321572 A1 | 11/2017 | Agara et al. | |
| 2018/0029688 A1* | 2/2018 | Connelly | B64D 29/02 |
| 2018/0057140 A1* | 3/2018 | Connelly | B64C 1/403 |
| 2019/0031362 A1* | 1/2019 | Petty, Sr. | F01D 9/02 |
| 2019/0100298 A1* | 4/2019 | Gladstone | F16L 59/028 |
| 2020/0248569 A1* | 8/2020 | Whittle | F01D 5/284 |
| 2021/0324799 A1* | 10/2021 | Suzuki | F01D 15/10 |
| 2022/0178260 A1* | 6/2022 | Quach | F01D 5/284 |

\* cited by examiner

SYSTEM AND METHOD FOR INSULATING COMPONENTS IN AN EXHAUST GAS FLOW FROM A GAS TURBINE

CROSS-REFERENCE TO RELATED APPLICATION

This application claims priority to and benefit of Polish Application No. P.440703, filed on Mar. 21, 2022; entitled "SYSTEM AND METHOD FOR INSULATING COMPONENTS IN AN EXHAUST GAS FLOW FROM A GAS TURBINE", which is herein incorporated by reference in its entirety.

BACKGROUND

The present application relates generally to a system and method for insulating components in an exhaust gas flow from a gas turbine.

A combustion system, such as a gas turbine engine, may diffuse an exhaust gas flow through an exhaust diffuser prior to discharge into the environment. The exhaust diffuser may include thermal insulation to provide heat resistance against high temperatures of the exhaust gas. For example, a sheet of thermal insulation may be held in place via a fixed cover plate, such as a welded cover plate. Unfortunately, the welded cover plate can create problems due to thermal expansion and contraction in the exhaust diffuser. Accordingly, a need exists for an improved system and method for mounting insulation in an exhaust diffuser and other components in an exhaust gas flow.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a system may include an insulation mount assembly configured to mount insulation within a component of an exhaust diffuser of a combustion system. The insulation mount assembly includes an insulation cover plate configured to cover the insulation over a wall of the component, and a plurality of mounting clips configured to extend partially over the insulation plate and couple to the wall of the component. Each clip of the plurality of mounting clips is configured to enable movement of the insulation cover plate in a first direction along a surface of the wall and block movement of the insulation cover plate in a second direction crosswise to the surface of the wall.

In certain embodiments, a system may include an exhaust diffuser having a central hub, an exhaust flow path disposed about the central hub, an outer wall disposed about the exhaust flow path, and a plurality of radial structures extending between the central hub and the outer wall. Each radial structure of the plurality of radial structures may include a wall disposed about a cavity, an insulation layer disposed over an interior surface of the wall, an insulation cover plate disposed over the insulation layer, and a plurality of mounting clips coupled to the wall. Each clip of the plurality of mounting clips enables movement of the insulation cover plate in a first direction along the interior surface and blocks movement of the insulation cover plate in a second direction crosswise to the interior surface.

In certain embodiments, a method may include positioning an insulation cover plate to cover an insulation layer over a wall of a component of an exhaust diffuser of a combustion system; and extending a plurality of mounting clips partially over the insulation cover plate. The method may also include coupling the plurality of mounting clips to the wall of the component. Each clip of the plurality of mounting clips is configured to enable movement of the insulation cover plate in a first direction along a surface of the wall and block movement of the insulation cover plate in a second direction crosswise to the surface of the wall.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

One or more specific embodiments of the presently disclosed systems are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

As discussed below, an insulation assembly may be coupled to one or more components of a gas turbine system, such as an exhaust diffuser downstream from a gas turbine. The insulation assembly may include insulation mounted in place by an insulation mounting assembly, which may include an insulation cover plate disposed over the insulation and secured by a plurality of mounting clips. The disclosed embodiments enable movement (or float) of the insulation cover plate in a first direction along (e.g., parallel to) the surface of the insulation and underlying component, while generally blocking movement of the insulation cover plate in a second direction crosswise (e.g., perpendicular) to the surface. For example, each of the mounting clips may be coupled to a wall of the component (e.g., exhaust diffuser) at a joint, such as a fixed joint (e.g., welded joint), while the respective mounting clips are not fixedly coupled to the insulation cover plate. Thus, the insulation cover plate can move to accommodate thermal expansion and contraction of the component, while still holding the insulation against the wall of the component. The component may include any part of the exhaust diffuser, such as a radial structure having an airfoil shape disposed in an exhaust flow path of the exhaust diffuser. However, the disclosed embodiments of the insulation assembly may be used in any component of the gas turbine system, the exhaust diffuser, or other equipment benefitting from insulation.

Figure 1:
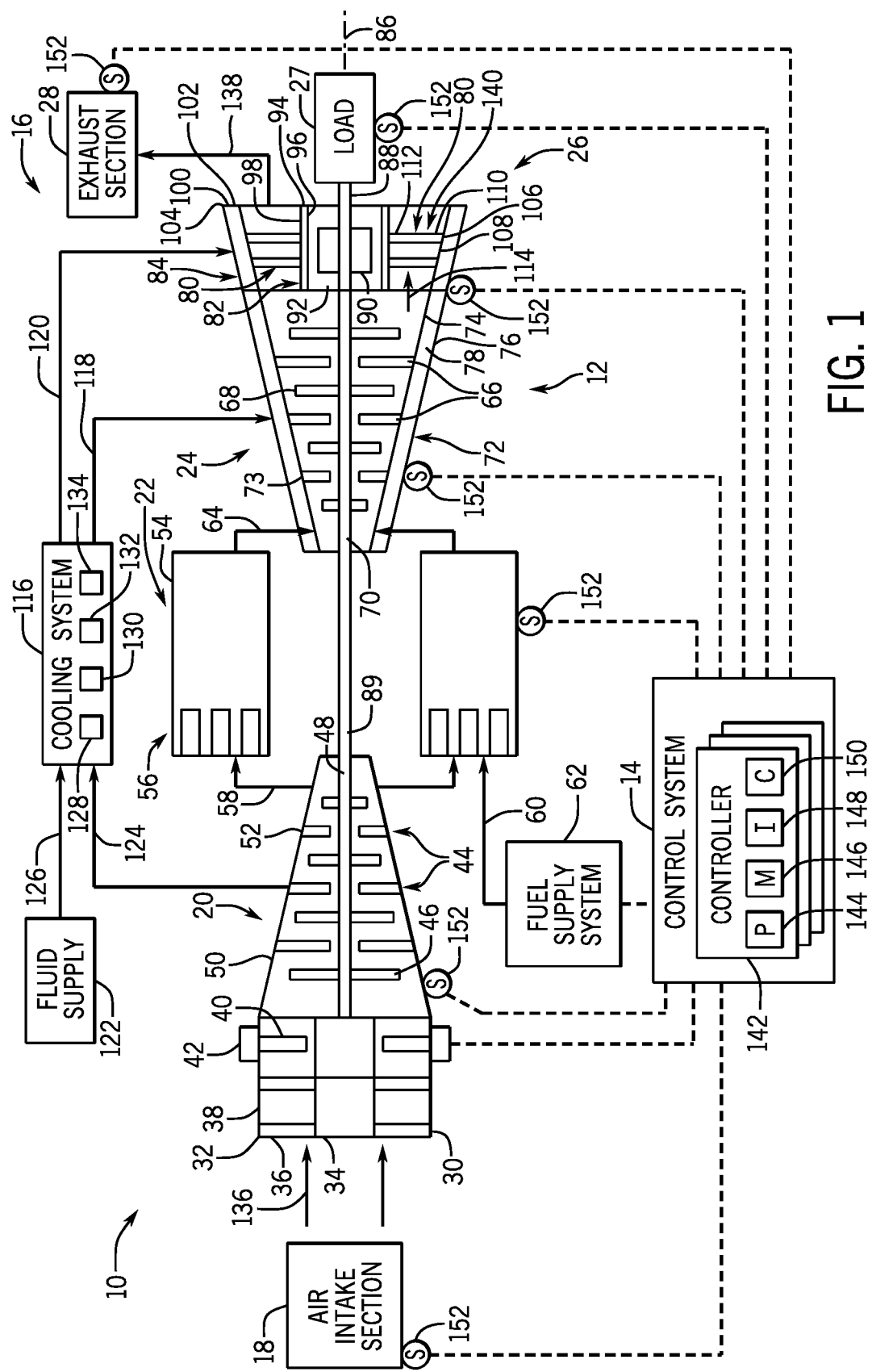
FIG. 1 is a schematic of an embodiment of a gas turbine system having a diffuser section downstream from a turbine section, wherein the diffuser section includes a plurality of radial structures extending between a central hub and an outer casing, and an insulation assembly is disposed at least in the radial structures.

FIG. 1 is a schematic of an embodiment of a gas turbine system 10 having a gas turbine engine 12 coupled to a control system 14. As discussed in further detail below, the gas turbine system 10 includes a thermal system 16 configured to control a temperature in one or more components of the gas turbine system 10. For example, the thermal system 16 includes an insulation assembly 140 configured to secure insulation sheets or layers with insulation cover plates that are allowed to move or float, thereby reducing stresses or damage caused by thermal expansion and contraction. The various features of the thermal system 16 are discussed below with reference to FIGS. 1-11, and the various features may be used in any suitable combination with one another. However, before moving on to the thermal system 16, the gas turbine system 10 will be described as one possible context for use of the thermal system 16.

The gas turbine engine 12 includes an air intake section 18, a compressor section 20, a combustor section 22, a turbine section 24, an exhaust diffuser or diffuser section 26, a load 27, and an exhaust section 28 (e.g., exhaust stack). The air intake section 18 may include a duct having one or more silencer baffles, fluid injection systems (e.g., heated fluid injection for anti-icing), air filters, or any combination thereof. The compressor section 20 may include an upstream inlet duct 30 having a bell mouth 32, wherein the inlet duct 30 includes an inner hub 34, an outer wall 36 disposed circumferentially about the inner hub 34 to define an air intake flow path, a plurality of stationary vanes 38 extending radially between the inner hub 34 and the outer wall 36 within the air intake flow path, and a plurality of inlet guide vanes (IGVs) 40 arranged circumferentially about a central axis within the air intake flow path. The inlet guide vanes 40 also may be coupled to one or more actuators 42, which are communicatively coupled to and controlled by the control system 14. In operation, the control system 14 is configured to adjust the position (e.g., angular position) of the inlet guide vanes 40 to vary the flow of intake air into the compressor section 20 during operation of the gas turbine engine 12. The angular position of each inlet guide vane 40 may be relative to a central axis of the inlet duct 30 and/or the compressor section 20, a radial axis relative to the central axis, or an adjacent inlet guide vane 40.

The compressor section 20 includes one or more compressor stages 44, wherein each compressor stage 44 includes a plurality of compressor blades 46 coupled to a compressor shaft 48 within a compressor casing 50, and a plurality of compressor vanes 52 coupled to the compressor casing 50. The compressor blades 46 and the compressor vanes 52 are arranged circumferentially about a central axis of the compressor shaft 48 within each compressor stage 44. The compressor stages 44 may include between 1 and 20 or more compressor stages. Additionally, the compressor stages 44 alternate between sets of the compressor blades 46 and sets of the compressor vanes 52 in the direction of flow through the compressor section 20. In operation, the compressor stages 44 progressively compress the intake air before delivery to the combustor section 22.

The combustor section 22 includes one or more combustors 54 each having one or more fuel nozzles 56. In certain embodiments, the combustor section 22 may have a single annular combustor 54 extending around a central axis of the gas turbine engine 12. However, in some embodiments, the combustor section 22 may include 2, 3, 4, 5, 6, or more combustors 54 spaced circumferentially about the central axis of the gas turbine engine 12. The fuel nozzles 56 receive a compressed air 58 from the compressor section 20 and fuel 60 from a fuel supply system 62, mix the fuel and air, and ignite the mixture to create hot combustion gases 64, which then exit each combustor 54 and enter the turbine section 24.

The turbine section 24 includes one or more turbine stages 66, wherein each turbine stage 66 includes a plurality of turbine blades 68 arranged circumferentially about and coupled to a turbine shaft 70 inside of a turbine casing 72, and a plurality of turbine vanes 73 arranged circumferentially about the turbine shaft 70. The turbine stages 66 may include between 1 and 10 or more turbine stages. Additionally, the turbine stages 66 alternate between sets of the turbine blades 68 and sets of the turbine vanes 73 in the direction of flow through the turbine section 24. In operation, the hot combustion gases 64 progressively expand and drive rotation of the turbine blades 68 in the turbine stages 66. In the illustrated embodiment, the turbine casing 72 includes an inner wall 74 disposed circumferentially about a central axis of the turbine shaft 70, an outer wall 76 disposed circumferentially about the inner wall 74, and a cooling flow path 78 disposed between the inner wall 74 and the outer wall 76. As discussed below, the cooling flow path 78 is configured to circulate a fluid flow (e.g., a coolant or cooling flow) to help reduce the temperature of the turbine section 24.

The diffuser section 26 is configured to expand the exhaust gas prior to discharge through the exhaust section 28. The diffuser section 26 includes a plurality of arms or radial structures 80 extending radially between a central hub 82 and an outer casing 84. The central hub 82 extends circumferentially about a central axis 86 of a shaft 88 coupled to the turbine shaft 70 and the load 27 (e.g., electrical generator, machine, etc.), wherein the shaft 88 is supported by one or more bearings 90 disposed in a cavity 92 surrounded by the central hub 82. The central hub 82 may include a cooling flow path 94 between an inner wall 96 and an outer wall 98 of the central hub 82, wherein the inner wall 96 extends circumferentially about the central axis 86, the cooling flow path 94 extends circumferentially about the inner wall 96, and the outer wall 98 extends circumferentially about the cooling flow path 94. The cooling flow path 94 also may extend into the cavity 92 as discussed in further detail below with reference to FIG. 2. Similarly, the outer casing 84 may include a cooling flow path 100 between an inner wall 102 and an outer wall 104 of the outer casing 84, wherein the inner wall 102 extends circumferentially about the central axis 86, the cooling flow path 100 extends circumferentially about the inner wall 102, and the outer wall 104 extends circumferentially about the cooling flow path 100.

The radial structures 80 of the diffuser section 26 are circumferentially spaced apart from one another about the central axis 86 and provide both cooling and structural support between the central hub 82 and the outer casing 84. In certain embodiments, the diffuser section 26 may include 2, 3, 4, 5, 6, 7, 8, 9, 10, or more radial structures 80 spaced uniformly or non-uniformly about the central axis 86. In the illustrated embodiment, each radial structure 80 has a cooling flow path 106 between a structural support or strut 108 and an outer wall or shell 110. The cooling flow path 106 is fluidly coupled with the cooling flow paths 100 and 94 to facilitate a cooling flow through the outer casing 84, the radial structures 80, and the central hub 82. The strut 108 is mechanically coupled to the central hub 82 (e.g., at the inner wall 96) and the outer casing 84 (e.g., at the outer wall 104). In certain embodiments, the strut 108 may be a solid strut or a hollow strut. The outer wall 110 of the radial structure 80 extends completely around the cooling flow path 106 and the strut 108, wherein the outer wall 110 and the strut 108 extend in a radial direction from the central hub 82 to the outer casing 84. In certain embodiments, the outer wall 110 may define an aerodynamic housing 112, such as an airfoil shaped housing or airfoil, disposed about the strut 108 at an offset distance to define the cooling flow path 106 about the strut 108. Thus, the aerodynamic housing 112 is configured to reduce flow resistance caused by the radial structures 80 along an exhaust flow path 114 between the central hub 82 and the outer casing 84.

As further illustrated in FIG. 1, the thermal system 16 includes a cooling system 116 fluidly coupled to the cooling flow path 78 in the turbine section 24 and the cooling flow paths 100, 106, and 94 in the diffuser section 26 via coolant supply lines or conduits 118 and 120, respectively. The cooling system 116 may receive a cooling fluid or coolant (e.g., gas coolant) from one or more sources, such as the compressor section 20 and/or a fluid supply 122 via coolant supply lines or conduits 124 and 126, respectively. For example, the conduit 124 may be a compressor bleed conduit configured to bleed a compressed gas (e.g., air) from the compressor section 20. The fluid supply 122 may be a standalone compressor, a compressed gas tank, a pipeline, or another source of fluid, such as a gas coolant. The gas coolant may include air, an inert gas (e.g., nitrogen), or another suitable gas. In certain embodiments, the cooling system 116 may include a plurality of components (e.g., 128, 130, 132, and 134) configured to condition, cool, compress, and/or regulate the cooling fluid (e.g., gas coolant) prior to delivery to the cooling flow paths 78, 100, 106, and 94. For example, the component 128 may include one or more conditioners and/or filters to remove water and/or particulate, the component 130 may include a cooler or heat exchanger configured to extract heat from the cooling fluid, the component 132 may include a compressor (e.g., boost compressor) configured to increase a pressure of the cooling fluid, and the component 134 may include a flow controller or regulator (e.g., a pressure regulator, a flow meter, a valve, etc.) configured to control a flow of the cooling fluid. The cooling system 116 is configured to supply the cooling fluid (e.g., gas coolant such as air) through the cooling flow path 78 in the turbine section 24 and the cooling flow paths 100, 106, and 94 in the diffuser section 26 to help control the temperatures and reduce thermal degradation of the components.

As discussed in further detail below, the thermal system 16 also includes an insulation assembly 140 coupled to one or more components of the diffuser section 26, such as the radial structures 80. For example, the insulation assembly 140 may be positioned inside the aerodynamic housing 112 along an interior surface of the outer wall 110. The insulation assembly 140 is configured to enable movement of insulation cover plates to accommodate thermal expansion and contraction of the radial structures 80, thereby helping to maintain the integrity and performance of insulation during operation of the gas turbine system 10. For example, the insulation assembly 140 may hold one or more insulation sheets in place via mounts (e.g., mounting clips) that enable movement or float of the insulation cover plate. Various aspects of the insulation assembly 140 will be discussed in further detail below.

In operation, the gas turbine system 10 receives air into the inlet duct 30 from the air intake section 18 as indicated by arrows 136, the inlet guide vanes 40 are controlled by the actuators 42 to adjust an angular position of the inlet guide vanes 40 for adjusting air flow into the compressor section 20, and the compressor section 20 is configured to compress the air flow being supplied into the combustor section 22. For example, each stage 44 of the compressor section 20 compresses the air flow with a plurality of the blades 46. The compressed air flow 58 then enters each of the combustors 54, where the fuel nozzles 56 mix the compressed air flow with fuel 60 from the fuel supply system 62. The mixture of fuel and air is then combusted in each combustor 54 to generate the hot combustion gases 64, which flow into the turbine section 24 to drive rotation of the turbine blades 68 in each of the stages 66. The rotation of the turbine blades 68 drives rotation of the turbine shaft 70, which in turn drives rotation of the load 27 and the compressor section 20 via the shaft 88 coupled to the load 27 and a shaft 89 coupled to the compressor shaft 48. The turbine section 24 then discharges an exhaust gas into the diffuser section 26 along the exhaust flow path 114 for expansion of the exhaust gas. Subsequently, as indicated by arrow 138, the exhaust gas discharges from the diffuser section 26 through the exhaust section 28 for final treatment and discharge into the environment. The exhaust section 28 may include an exhaust duct, exhaust treatment equipment, silencers, or any combination thereof. In some embodiments, the exhaust section 28 may include a heat exchanger, such as a heat recovery steam generator (HRSG) configured to generate steam to drive a steam turbine.

The control system 14 may include one or more controllers 142, each having a processor 144, memory 146, instructions 148 stored on the memory 146 and executable by the processor 144, and communications circuitry 150 configured to communicate with the gas turbine system 10, including the cooling system 116. The control system 14 is also coupled to various sensors (S) as indicated by element number 152 throughout the gas turbine system 10. For example, the sensors 152 may be coupled to and monitor conditions at the air intake section 18, the compressor section 20, the combustors 54 of the combustor section 22, the turbine section 24, the diffuser section 26, the load 27, the exhaust section 28, and various components of the thermal system 16. The control system 14 is configured to receive feedback from the sensors 152 to facilitate adjustments of various operating parameters of the gas turbine engine 12, such as the air intake flow, the fuel supply from the fuel supply system 62 to the combustors 54, operation of exhaust treatment equipment in the exhaust section 28, cooling flow provided by the cooling system 116, or any combination thereof.

Figure 2:
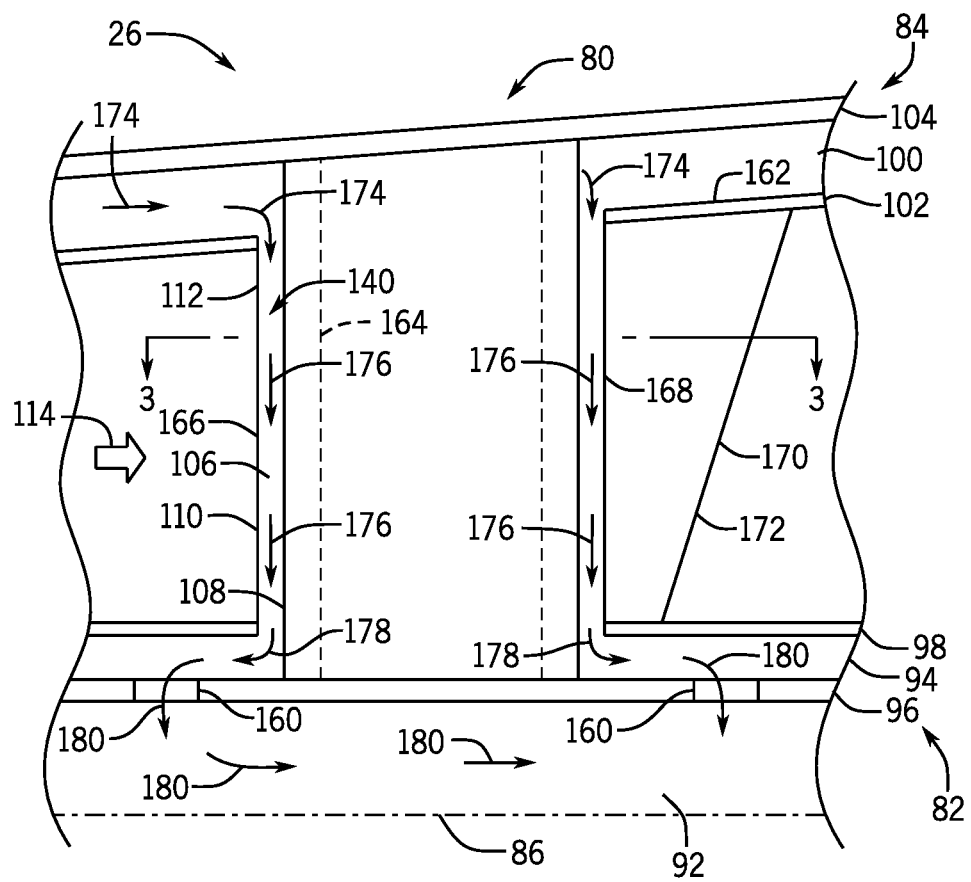
FIG. 2 is a partial cross-sectional side view of an embodiment of the diffuser section of FIG. 1, further illustrating details of the radial structure having the insulation assembly.

FIG. 2 is a partial cross-sectional side view of an embodiment of the diffuser section 26 of FIG. 1, further illustrating details of the radial structure 80, the central hub 82, and the outer casing 84. As illustrated, the central hub 82 has the cooling flow path 94 disposed between the inner wall 96 and the outer wall 98, wherein the cooling flow path 94, the inner wall 96, and the outer wall 98 extend circumferentially about the central axis 86. The inner wall 96 may include a plurality of cooling ports or openings 160 to facilitate flow of the cooling fluid from the cooling flow path 94 into the cavity 92 having the bearing 90. Similarly, the outer casing 84 has the cooling flow path 100 disposed between the inner wall 102 and the outer wall 104, wherein the cooling flow path 100, the inner wall 102, and the outer wall 104 extend circumferentially about the central axis 86. Additionally, the outer casing 84 extends circumferentially about the exhaust flow path 114, which is disposed between the outer casing 84 and the central hub 82. In the illustrated embodiment, the outer casing 84 generally expands or diverges outwardly away from the central axis 86 in a downstream direction of exhaust flow along the exhaust flow path 114. Accordingly, the inner wall 102 may have a tapered annular wall structure 162, which diverges relative to the central axis 86 in the downstream direction of the exhaust flow path 114. For example, the tapered annular wall structure 162 may include a conical wall structure, a curved annular wall structure, or a combination thereof, disposed circumferentially about the central axis 86.

The cooling flow path 100 of the outer casing 84 is fluidly coupled to the cooling flow path 94 of the central hub 82 via the cooling flow path 106 between the strut 108 and the outer wall 110 of the radial structure 80. As illustrated, the cooling flow path 106 extends around the strut 108 inside the outer wall 110. The strut 108 may include a solid strut or a hollow strut having a hollow interior 164, which may extend in a radial direction between the central hub 82 and the outer casing 84. In the illustrated embodiment, the strut 108 mechanically couples to, and extends between, the outer wall 104 of the outer casing 84 and the inner wall 96 of the central hub 82. The outer wall 110 of the radial structure 80 mechanically couples to, and extends between, the inner wall 102 of the outer casing 84 and the outer wall 98 of the central hub 82. As discussed above, the radial structure 80 may have an aerodynamic housing 112 (e.g., airfoil) formed by an aerodynamic or airfoil shape of the outer wall 110. The cooling flow path 106 within the radial structure 80 extends along an interior surface of the outer wall 110 from an upstream or leading edge 166 to a downstream or trailing edge 168 of the aerodynamic housing 112. The radial structure 80 also includes a fairing 170 coupled to the trailing edge 68 of the aerodynamic housing 112. Accordingly, the fairing 170 may define a downstream or trailing edge 172 of the entire radial structure 80.

In operation, an exhaust flow passes through the diffuser section 26 between the central hub 82 and the outer casing 84 along the exhaust flow path 114, such that the exhaust flow passes around opposite lateral sides of the radial structure 80 from the leading edge 166 to the trailing edge 172. The exhaust flow path 114 generally extends circumferentially about the central hub 82, such that the exhaust flow path 114 may be a diverging or expanding annular flow path about the central axis 86. As the exhaust gas flows through the diffuser section 26, the radial structure 80 is subjected to the heat from the exhaust gas. Accordingly, the cooling system 116 discussed above with reference to FIG. 1 supplies a cooling fluid through the diffuser section 26 as indicated by arrows 174 in the cooling flow path 100, arrows 176 in the cooling flow path 106, arrows 178 in the cooling flow path 94, and arrows 180 through the openings 160 into the cavity 92. Accordingly, the cooling fluid provides cooling through the outer casing 84, through the radial structures 80, through the central hub 82, and through the cavity 92 that houses one or more bearings 90. Additionally, the thermal system 16 includes the insulation assembly 140 configured to provide insulation along an interior surface of the outer wall 110 of the radial structure 80. As discussed in further detail below, the insulation assembly 140 includes insulation 190 secured by an insulation mount assembly 192 along an interior of the outer wall 110 of the radial structure 80.

Figure 3:
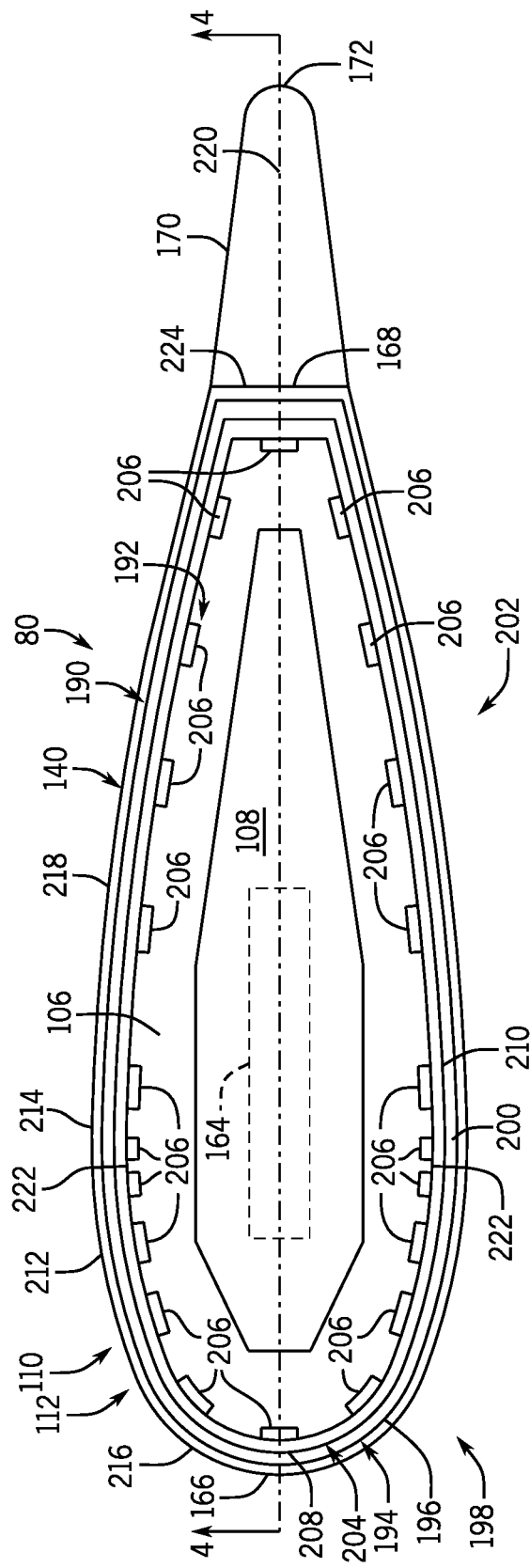
FIG. 3 is a cross-sectional view of an embodiment of the radial structure of FIGS. 1 and 2 taken along line 3-3 of FIG. 2, further illustrating an aerodynamic housing disposed about a strut, wherein the insulation assembly includes an insulation cover plate disposed over insulation and retained by mounting clips within an outer wall of the aerodynamic housing.

FIG. 3 is a cross-sectional view of an embodiment of the radial structure 80 of FIGS. 1 and 2 taken along line 3-3 of FIG. 2, further illustrating details of the radial structure 80 and the insulation assembly 140. As illustrated, the insulation 190 may include one or more insulation layers or sheets 194 disposed along an interior surface of the outer wall 110, wherein the insulation layer or sheet 194 may be a continuous or segmented insulation layer throughout substantially all of the interior surface of the outer wall 110. For example, in the illustrated embodiment, the insulation layer or sheet 194 may have an insulation portion 196 in an upstream section 198 of the radial structure 80 and an insulation portion 200 in a downstream section 202 of the radial structure 80. Each of these insulation portions 196 and 200 may include one or more insulation layers or sheets to collectively define the insulation layer or sheet 194 of the insulation 190.

The insulation mount assembly 192 may include an insulation cover plate 204 disposed over the insulation 190 and secured by a plurality of insulation mounts or mounting clips 206. The mounting clips 206 may be made of a metal, such as stainless steel (e.g., SAE 304 stainless steel). The insulation cover plate 204 may be made of a metal, such as stainless steel (e.g., SAE 304 stainless steel). The outer wall 110 of the radial structure 80 may be made of a metal, such as stainless steel (e.g., SAE 347 stainless steel). The insulation 190 may include a fiber insulation, such as a ceramic fiber insulation, a glass fiber insulation, and/or a ceramic fiberglass insulation. The insulation cover plate 204 may include one or more cover plates, such as a cover plate portion 208 disposed in the upstream section 198 and a cover plate portion 210 disposed in the downstream section 202 of the radial structure 80. Accordingly, the cover plate portion 208 may extend over the insulation portion 196 in the upstream section 198, while the cover plate portion 210 may extend over the insulation portion 200 in the downstream section 202.

The mounting clips 206 are distributed throughout the radial structure 80 in both of the upstream section 198 and the downstream section 202, thereby providing retention for the insulation 190 covered by the insulation cover plate 204. As discussed in further detail below, the mounting clips 206 are configured to enable each of the cover plate portions 208 and 210 to move (or float) relative to the insulation 190 and the outer wall 110 of the radial structure 80, for example, in a direction along (e.g., parallel to) the interior surface of the outer wall 110. In certain embodiments, the insulation cover plates in each of the upstream and downstream sections 198 and 202 (e.g., one or more cover plates in each of the cover plate portions 208 and 210) are configured to move independently from one another via the mounting clips 206.

In the illustrated embodiment, the outer wall 110 of the radial structure 80 may include a wall portion 212 disposed in the upstream section 198 and a wall portion 214 disposed in the downstream section 202 of the radial structure 80. The wall portion 212 in the upstream section 198 may be defined as a curved nose portion 216 of the aerodynamic housing 112, while the wall portion 214 in the downstream section 202 may be defined as a curved tail or rear portion 218 of the aerodynamic housing 112. The insulation portion 196 and the cover plate portion 208 generally follow the contour of the curved nose portion 216, and thus may be described as a part of the curved nose portion 216. Similarly, the insulation portion 200 and the cover plate portion 210 generally follow the contour of the curved rear portion 218, and thus may be described as a part of the curved rear portion 218. Collectively, the outer wall 110, the insulation 190, and the insulation cover plate 204 generally curve about opposite sides of a central axis or plane 220 through the aerodynamic housing 112 from the leading edge 166 to the trailing edge 168, thereby defining the curved nose and rear portions 216 and 218. In certain embodiments, the aerodynamic housing 112, including the curved nose portion 216 and the curved rear portion 218, may be symmetric about the central plane 220.

The curved nose portion 216 of the upstream section 198 is coupled to the curved rear portion 218 of the downstream section 202 at joints 222 (e.g., joints on opposite lateral sides of the outer wall 110), wherein the joints 222 may be welded joints (e.g., weld lines or seams) along the radial length of the radial structure 80. Accordingly, the insulation layer or sheet 194 and the insulation cover plate 204 may extend continuously or break at the joints 222, as indicated by the insulation portions 196 and 200 and the cover plate portions 208 and 210 in the respective upstream and downstream sections 198 and 202. The curved rear portion 218 of the downstream section 202 extends towards the downstream trailing edge 168, which may include a flat rear wall 224, which is coupled to the fairing 170.

The insulation mount assembly 192 is configured to hold the insulation 190 against the interior surface of the outer wall 110, while allowing movement of the insulation cover plate 204 via the mounting clips 206. For example, one or more of the mounting clips 206 may be coupled to portions of the outer wall 110 via fixed or removable joints (e.g., welded joints or threaded fasteners) to hold the mounting clips 206 in stationary positions relative to the outer wall 110, while allowing movement of the insulation cover plate 204 relative to the mounting clips 206 and the outer wall 110. In contrast, the mounting clips 206 may not be fixedly coupled to the insulation cover plate 204, such that the insulation cover plate 204 can move in a direction along (e.g., parallel to) the interior surface of the outer wall 110. Alternatively or additionally, one or more of the mounting clips 206 may be coupled to portions of the insulation cover plate 204 via fixed or removable joints (e.g., welded joints or threaded fasteners) to hold the mounting clips 206 in stationary positions relative to the insulation cover plate 204, while allowing movement of the insulation cover plate 204 relative to the outer wall 110 via movable joints (e.g., male/female rail connection, an enlarged head in a slot, a hook in a slot, a male/female dovetail joint, etc.) between the mounting clips 206 and the outer wall 110. Embodiments of the insulation mount assembly 192 may include one or more mounting clips 206 arranged in each of the foregoing configurations to enable movement of the insulation cover plate 204 (e.g., one or more cover plates in the cover plate portions 208 and 210).

In either configuration, the mounting clips 206 are distributed throughout the interior of the radial structure 80, such that the mounting clips 206 may be disposed along outer edges and/or interior areas of the insulation cover plate 204, such as at the outer edges and/or interior portions of the cover plate portions 208 and 210. In certain embodiments, the mounting clips 206 may be coupled to the insulation cover plate 204 (e.g., cover plate portions 208 and 210) at 1, 2, 3, 4, 5, 6, 7, 8, 9, 10, or more locations along each edge of the insulation cover plate 204 (e.g., each of four edges of a rectangular insulation cover plate) and one or more interior portions of the insulation cover plate 204. Additional details of the insulation assembly 140 are discussed in further detail below.

Figure 4:
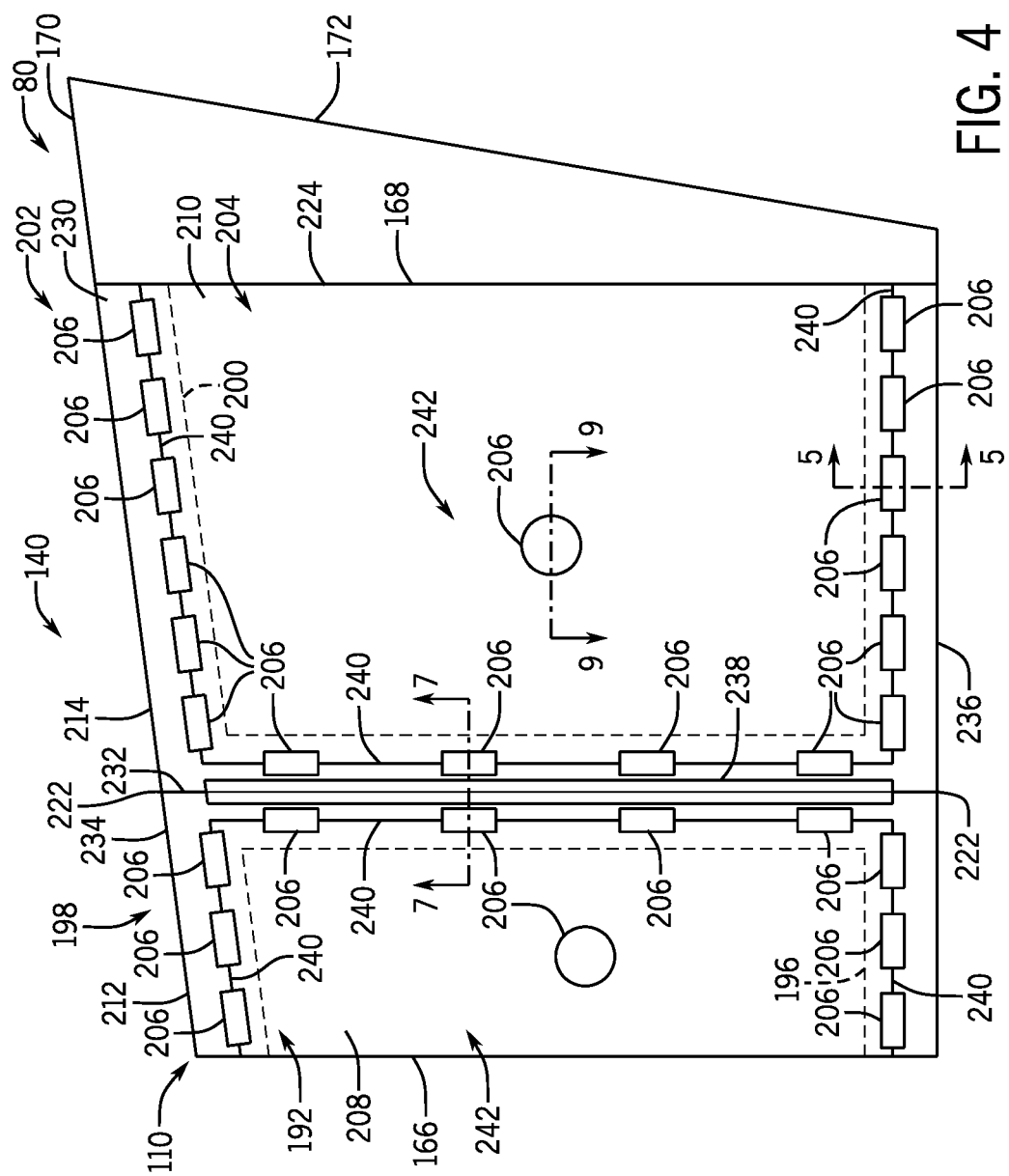
FIG. 4 is a cross-sectional interior side view of an embodiment of the radial structure of FIGS. 1-3 taken along line 4-4 of FIG. 3, further illustrating the insulation assembly disposed along an interior surface of the outer wall, wherein the mounting clips are disposed along edges and interior portions of cover plate portions of the insulation cover plate.

FIG. 4 is a cross-sectional interior side view of an embodiment of the radial structure 80 of FIGS. 1-3 taken along line 4-4 of FIG. 3, further illustrating the insulation assembly 140 disposed along an interior surface 230 of the outer wall 110 with the strut 108 removed for clarity. As illustrated, the wall portions 212 and 214 of the outer wall 110 are coupled together along the joint 222 between the downstream and upstream sections 198 and 202, wherein the joint 222 may be a welded joint extending in a line 232 (e.g., a weld line or seam) between a radially outer or top edge 234 and a radially inner or bottom edge 236 of the outer wall 110. The joint 222 also may include a support strip 238 extending along the line 232 of the weld at the joint 222. For example, the support strip 238 may be configured to facilitate welding along the joint 222, and may include a suitable welding material (e.g., SAE 304 stainless steel) compatible with the outer wall 110. On opposite sides of the joint 222, the upstream section 198 has the cover plate portion 208 disposed over the insulation portion 196 and secured by a plurality of the mounting clips 206, wherein the mounting clips 206 are disposed along the radially outer or top edge 234, along the support strip 238, and along the radially inner or bottom edge 236. Similarly, the downstream section 202 has the cover plate portion 210 disposed over the insulation portion 200 and secured by a plurality of the mounting clips 206, wherein the mounting clips 206 are disposed along the radially or top edge 234, along the support strip 238, and along the radially inner or bottom edge 236.

In certain embodiments, each of the mounting clips 206 may be coupled to the outer wall 110, such as by a welded joint or another fixed or removable joint. However, the mounting clips 206 are not fixedly coupled to the cover plate portions 208 and 210, such that the cover plate portions 208 and 210 can move in a direction along (e.g., parallel to) the interior surface 230 of the wall portions 212 and 214. The mounting clips 206 block movement of the cover plate portions 208 and 210 in a direction crosswise (e.g., perpendicular) to the interior surface 230 of the wall portions 212 and 214, thereby holding the cover plate portions 208 and 210 against the insulation portions 196 and 200 along the interior surface 230. Accordingly, the cover plate portions 208 and 210 are able to float or move along the interior surface 230 in response to thermal expansion and contraction of various components of the radial structure 80.

As discussed in further detail below, the mounting clips 206 may engage with outer edges or perimeters 240 of the cover plate portions 208 and 210 along the radially outer or top edge 234, the support strip 238, and the radially inner or bottom edge 236 to hold the cover plate portions 208 and 210 over the insulation portions 196 and 200. Additionally, the mounting clips 206 may be disposed at one or more interior portions 242 of the cover plate portions 208 and 210, thereby securing central areas of the cover plate portions 208 and 210 to the respective wall portions 212 and 214 of the outer wall 110. Each of these mounting clips 206, whether disposed along the edges 240 or the interior portions 242, is configured to enable movement of the cover plate portions 208 and 210 to accommodate thermal expansion and contraction of components of the radial structure 80. These mounting clips 206 and their mounting locations are discussed in further detail below with reference to FIGS. 5-11.

Figure 5:
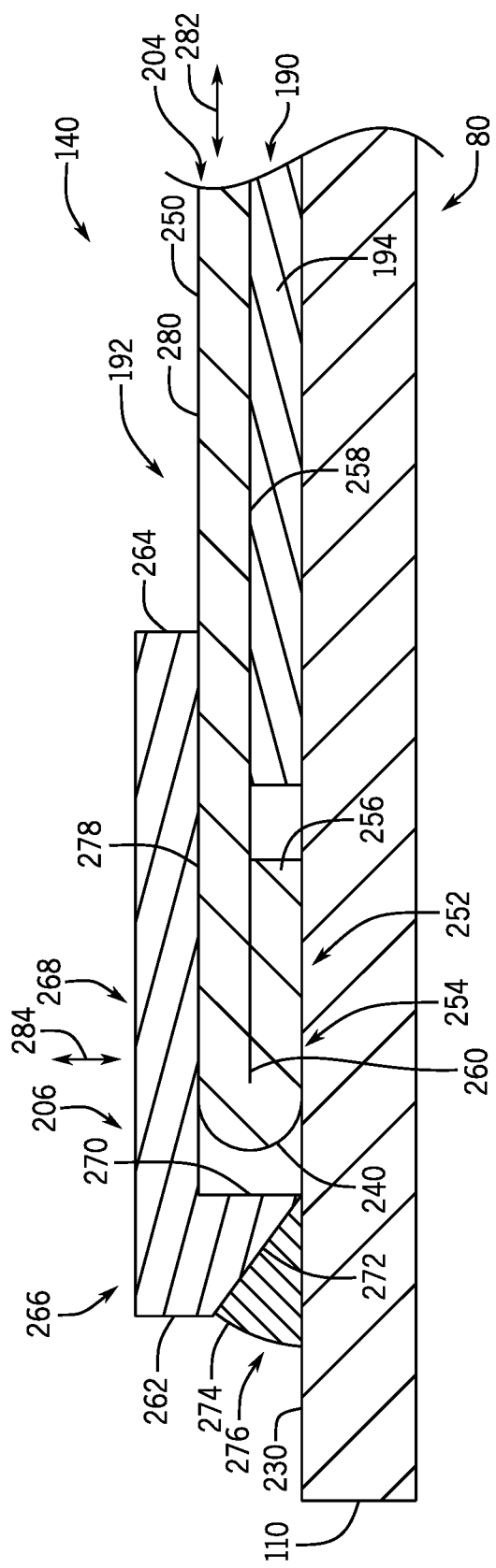
FIG. 5 is a partial cross-sectional view of an embodiment of the radial structure of FIGS. 1-4 taken along line 5-5 of FIG. 4, further illustrating a mounting clip disposed along an edge of an insulation cover plate over insulation inside the outer wall.

FIG. 5 is a partial cross-sectional view of an embodiment of the radial structure of FIGS. 1-4 taken along line 5-5 of FIG. 4, further illustrating a mounting clip 206 disposed along an edge 240 of an insulation cover plate 204 over insulation 190 inside the outer wall 110. For example, the illustrated embodiment depicts details of the insulation mount assembly 192 at each of the mounting clips 206 disposed along the edges 240 of the cover portions 208 and 210 of the insulation cover plate 204. As illustrated, the insulation assembly 140 has the insulation 190 disposed along the interior surface 230 of the outer wall 110, the insulation cover plate 204 disposed over the insulation 190 and the outer wall 110, and the mounting clip 206 disposed over a portion of the insulation cover plate 204 and coupled to the outer wall 110.

In particular, the insulation cover plate 204 has a central plate portion 250 surrounded by a peripheral plate portion or border 252, wherein the peripheral plate portion 252 extends to the edge 240 of the insulation cover plate 204 and includes an enlarged border 254. For example, in certain embodiments, the enlarged border 254 may have an increased thickness relative to the central plate portion 250, such as an additional spacer portion 256 attached to an interior side 258 of the insulation cover plate 204. For example, the spacer portion 256 may be a continuous piece of the insulation cover plate 204, an additional piece added onto the insulation cover plate 204, a bent portion of the insulation cover plate 204, or a combination thereof. In the illustrated embodiment, the insulation cover plate 204 includes a bend or fold 260 of the insulation cover plate 204 at the edge 240, thereby defining the enlarged border 254 having the spacer portion 256. For example, the bend or fold 260 may be part of a hem flange along the edge 240 of the peripheral plate portion 252. The spacer portion 256 may have a thickness less than or equal to a thickness of the insulation 190 prior to assembly of the insulation assembly 140. For example, the spacer portion 256 may have a reduced thickness to enable the insulation cover plate 204 to at least partially compress (e.g., at least 20, 30, 40, 50, or more percent compression of) the insulation 190 between the insulation cover plate 204 and the outer wall 110. For example, the insulation 190 may be compressed from 4 mm to 2 mm thick when the insulation cover plate 204 is mounted over the insulation 190.

The mounting clip 206 extends over a portion of the insulation cover plate 204 and across the edge 240. As illustrated, the mounting clip 206 extends between end portions 262 and 264 across the edge 240, wherein the mounting clip 206 has an enlarged head 266 disposed adjacent the end portion 262 and an elongated rectangular body 268 extending from the enlarged head 266 to the end portion 264. The enlarged head 266 may have an increased thickness relative to the elongated rectangular body 268, such that the enlarged head 266 extends across the thickness of the peripheral plate portion or border 252 of the insulation cover plate 204 and contacts the interior surface 230 of the outer wall 110. Additionally, the enlarged head 266 may include a flat inner stop 270 facing the edge 240 of the insulation cover plate 204 and a tapered portion 272 configured to facilitate joining of the mounting clip 206 to the outer wall 110. For example, the flat inner stop 270 is configured to provide an abutment surface or stop structure for the edge 240 of the insulation cover plate 204. The enlarged head 266 may be fixedly coupled to the interior surface 230 of the outer wall 110 via a joint 274, such as a welded joint, which bonds the material of the mounting clip 206 to the material of the outer wall 110. The tapered portion 272 provides an angled recess area 276 between the enlarged head 266 and the outer wall 110 to facilitate bonding along the joint 274, e.g., a welded joint. The elongated rectangular body 268 may be a flat plate having a planar inner surface 278 facing an outer surface 280 of the insulation cover plate 204.

In operation, the elongated rectangular body 268 enables the insulation cover plate 204 to move in a first direction (e.g., parallel direction 282) along the surfaces 278 and 280 and the interior surface 230 of the outer wall 110, for example, in response to thermal expansion and contraction of the radial structure 80. In the illustrated embodiment, the mounting clip 206 is coupled to the outer wall 110 via the joint 274, while the mounting clip 206 is not fixedly coupled to the insulation cover plate 204. The mounting clip 206 is configured to block movement of the insulation cover plate 204 in a second direction (e.g., a crosswise direction 284, such as a perpendicular direction) relative to the interior surface 230 and the surfaces 278 and 280, while enabling movement in the first direction (e.g., parallel direction 282).

Additional details of the mounting clips 206 and the insulation mount assembly 192 are discussed in further detail below.

Figure 6:
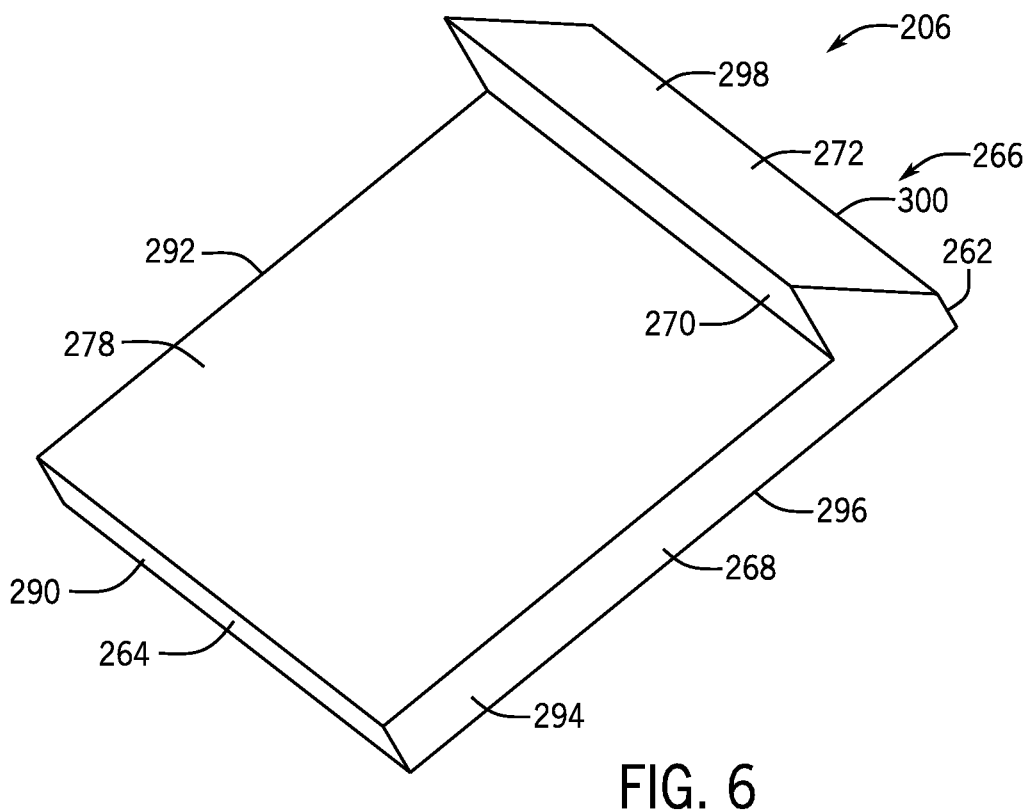
FIG. 6 is a perspective view of an embodiment of the mounting clip of the insulation assembly of FIGS. 1-5.

FIG. 6 is a perspective view of an embodiment of the mounting clip 206 of FIGS. 3-5, further illustrating details of the enlarged head 266 and the elongated rectangular body 268. As illustrated, the elongated rectangular body 268 extends from the end portion 264 to the flat inner stop 270, wherein the elongated rectangular body 268 includes an end wall 290 offset and parallel to the flat inner stop 270. The elongated rectangular body 268 includes opposite side walls 292 and 294 parallel to one another and perpendicular to the end wall 290 and the flat inner stop 270. The elongated rectangular body 268 includes the planar inner surface 278 extending between the end wall 290, the flat inner stop 270, and the opposite side walls 292 and 294. The elongated rectangular body 268 also includes an opposite planar outer surface 296 parallel to the planar inner surface 278. In some embodiments, the elongated rectangular body 268 may have other shapes or geometries configured to enable movement of the insulation cover plate 204 as discussed in detail above. The enlarged head 266 includes the tapered portion 272 having an angled surface 298 extending between the opposite side walls 292 and 294, wherein the angled surface 298 also extends between the flat inner stop 270 and an end wall 300 at the end portion 262. The angled surface 298 may be angled relative to the flat inner stop 270 at an angle of less than or equal to approximately 20, 30, 40, 50, 60, or 70 degrees. Additionally, the flat inner stop 270 may be angled relative to the planar inner surface 278 at an angle of approximately 90 degrees.

Figure 7:
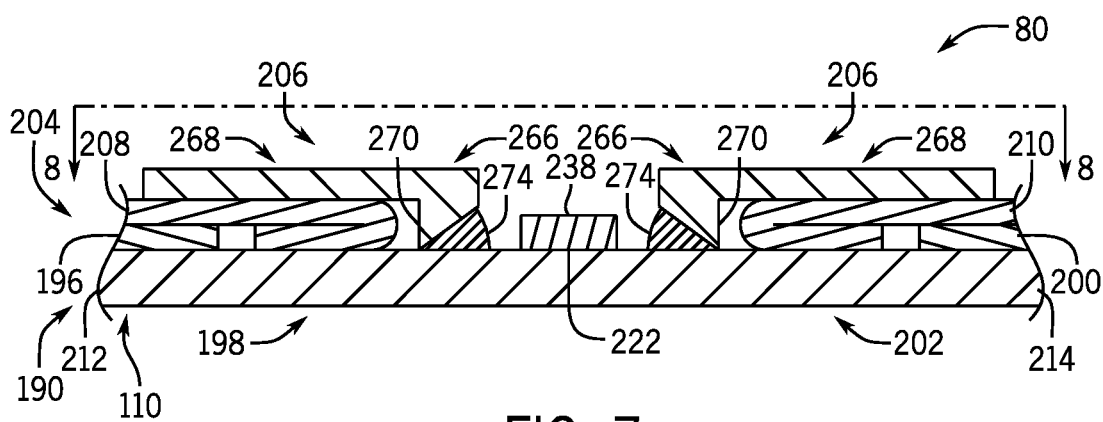
FIG. 7 is a partial cross-sectional view of an embodiment of the radial structure of FIGS. 1-4 taken along line 7-7 of FIG. 4, further illustrating a pair of mounting clips disposed over cover plate portions on opposite sides of a joint having a support strip.

FIG. 7 is a partial cross-sectional view of an embodiment of the radial structure 80 of FIGS. 1-4 taken along line 7-7 of FIG. 4, further illustrating a pair of mounting clips 206 disposed over the cover plate portions 208 and 210 on opposite sides of the joint 222 having the support strip 238. In particular, the illustrated embodiment depicts details of the insulation mount assembly 192 along the joint 222 between the upstream and downstream sections 198 and 202. As illustrated in FIG. 7, the support strip 238 is disposed over and along the joint 222 between the wall portions 212 and 214 of the outer wall 110, wherein the support strip 238 may be further secured to the wall portions 212 and 214 via welding, brazing, or another suitable fastener. On opposite sides of the joint 222, the mounting clips 206 are disposed over the cover plate portions 208 and 210, which are in turn disposed over the respective insulation portions 196 and 200. Each of the illustrated arrangements of mounting clips 206, cover plate portions 208 and 210, and insulation portions 196 and 200 are substantially the same as described in detail above with reference to FIG. 5. In other words, the mounting details described above with reference to FIG. 5 can be used on opposite sides of the joint 222 as illustrated in FIG. 7. In certain embodiments, the mounting clips 206 may have the flat inner stops 270 directly aligned with the edges 240 of the cover plate portions 208 and 210. However, in certain embodiments, the enlarged heads 266 of the mounting clips 206 may be partially recessed relative to the edge 240 of the cover plate portions 208 and 210.

Figure 8:
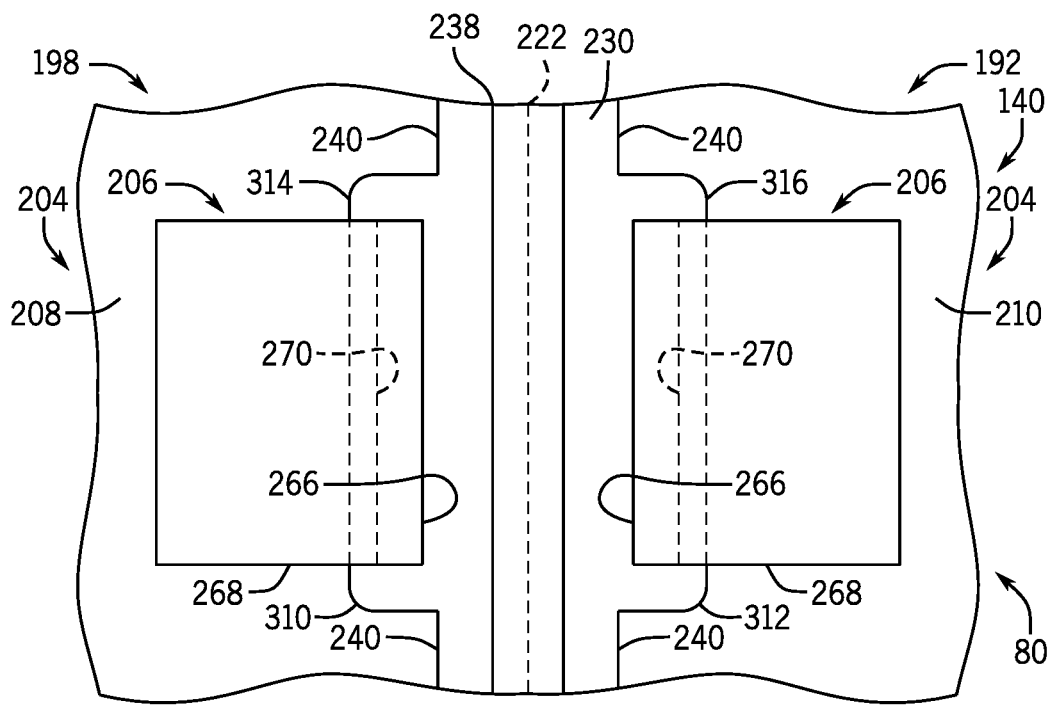
FIG. 8 is a top view of an embodiment of the radial structure of FIGS. 1-4 taken along line 8-8 of FIG. 7, further illustrating the pair of mounting clips disposed in recesses in the cover plate portions.

FIG. 8 is a top view of an embodiment of the radial structure 80 of FIGS. 1-4 taken along line 8-8 of FIG. 7, further illustrating the pair of mounting clips 206 disposed in recesses 310 and 312 in the respective cover plate portions 208 and 210. The mounting clips 206 are engaged with, and partially extend over, the cover plate portions 208 and 210 disposed over the insulation portions 196 and 200. In the illustrated embodiment, the cover plate portion 208 includes the recess 310 extending inwardly away from the edge 240 to accommodate the mounting clip 206. Similarly, the cover plate portion 210 includes the recess 312 extending inwardly away from the edge 240 to accommodate the mounting clip 206. For example, the recess 310 may include a cutout in the cover plate portion 208 with a recessed edge 314 that is substantially parallel with the edge 240 and the support strip 238, such that the enlarged head 266 of the mounting clip 206 may be at least partially or entirely disposed within the recess 310. Similarly, the recess 312 may include a cutout in the cover plate portion 210 with a recessed edge 316 that is substantially parallel with the edge 240 and the support strip 238, such that the enlarged head 266 of the mounting clip 206 may be at least partially or entirely disposed in the recess 312.

As illustrated, the flat inner stop 270 of the enlarged head 266 of the mounting clip 206 over the cover plate portion 208 is disposed within the recess 310 at an offset distance relative to the recessed edge 314, such that the cover plate portion 208 has space to move in the parallel direction 282 along the outer wall 110. Similarly, the flat inner stop 270 of the enlarged head 266 of the mounting clip 206 over the cover plate portion 210 is disposed within the recess 312 at an offset distance relative to the recessed edge 316, such that the cover plate portion 210 has space to move in the parallel direction 282 along the outer wall 110. Additionally, the recesses 310 and 312 enable the edges 240 of the cover plate portions 208 and 210 to be positioned closer to the support strip 238, such that the cover plate portions 208 and 210 can support the insulation portions 196 and 200 in closer proximity to the support strip 238.

The illustrated configuration of the cover plate portions 208 and 210 with the recesses 310 and 312 may be disposed at any location along the cover plate portions 208 and 210, including the edges 240 along the radially outer or top edge 234 and the radially inner or bottom edge 236 of the radial structure 80. Accordingly, the illustrated configuration of the recesses 310 and 312 and the mounting clips 206 of FIG. 8 are not limited to the configuration along the support strip 238 as depicted in FIG. 7. The mounting clips 206 within recesses is intended to be used at any location to facilitate mounting and relative movement of the insulation cover plate 204.

Figure 9:
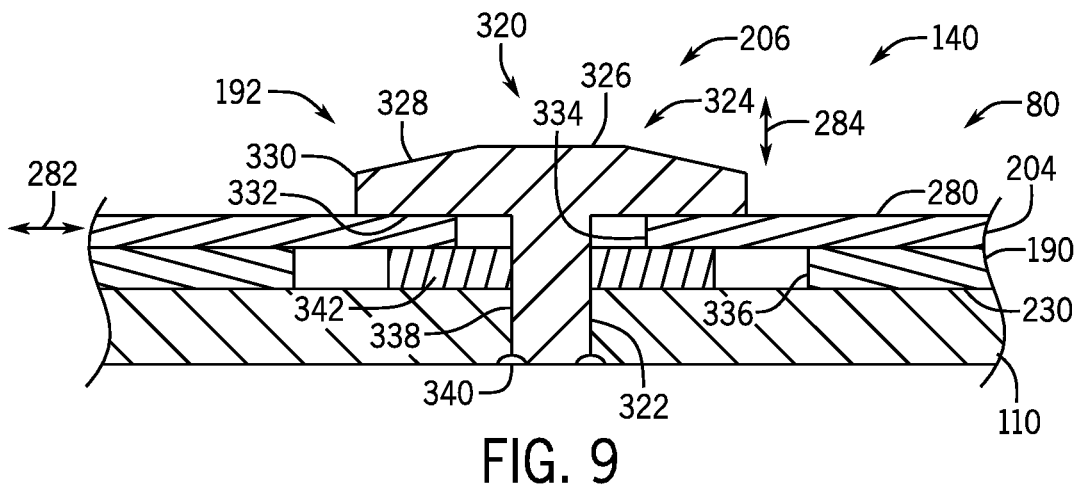
FIG. 9 is a partial cross-sectional view of an embodiment of the radial structure of FIGS. 1-4 taken along line 9-9 of FIG. 4, further illustrating a mounting clip disposed in an interior portion of the insulation cover plate over insulation on the outer wall.

FIG. 9 is a partial cross-sectional view of an embodiment of the radial structure 80 of FIGS. 1-4 taken along line 9-9 of FIG. 4, further illustrating a mounting clip 206 disposed in the interior portion 242 of the insulation cover plate 204 over insulation 190 on the outer wall 110. In the illustrated embodiment, the mounting clip 206 may be a central mounting clip 320 having a stem or shaft 322 coupled to an enlarged head 324. For example, the stem or shaft 322 may be a cylindrical shaft, while the enlarged head 324 may be a circular head. For example, the enlarged head 324 may include a raised central portion 326 coupled to the stem or shaft 322, a tapered annular portion 328 extending circumferentially around the raised central portion 326, and a circular outer perimeter 330 extending about the tapered annular portion 328. Additionally, the enlarged head 324 may include a planar inner surface 332 (e.g., planar annular surface) configured to face against the outer surface 280 of the insulation cover plate 204. In the illustrated embodiment, the stem or shaft 322 extends through an opening 334 in the insulation cover plate 204, an opening 336 in the insulation 190, and a bore 338 through the outer wall 110. In certain embodiments, the stem or shaft 322 is fixedly coupled to the outer wall 110 via a joint 340, such as a welded joint, which may be subsequently machined to be flush with a surface of the outer wall 110.

As further illustrated in FIG. 9, the insulation mount assembly 192 may include a washer 342 disposed about the stem or shaft 322 between the insulation cover plate 204 and the outer wall 110. The washer 342 may have a thickness configured to provide a desired spacing between the outer wall 110 and the insulation cover plate 204, thereby controlling the compression of the insulation 190 between the outer wall 110 and the insulation cover plate 204. For example, a thickness of the washer 342 may be selected to provide at least 5, 10, 15, 20, 30, 40, or 50 percent compression of the insulation 190 when the insulation cover plate 204 is mounted over the insulation 190 via the central mounting clip 320.

The central mounting clip 320 may be disposed at one or more locations in each of the cover plate portions 208 and 210 to provide retention in the interior portions 242 of the cover plate portions 208 and 210. Additionally, in certain embodiments, the central mounting clips 320 may be used along the edges 240, or at least in the proximity of the edges 240, to provide retention of the cover plate portions 208 and 210. The opening 334 in the insulation cover plate 204 is sized sufficiently larger than the diameter of the stem or shaft 322, thereby enabling lateral movement of the insulation cover plate 204 in the parallel direction 282 as discussed above with reference to FIG. 5. Additionally, the enlarged head 324 has a diameter greater (e.g., 1.5, 2, 2.5, or 3 times greater) than the opening 334, thereby blocking movement of the insulation cover plate 204 in the crosswise direction 284 (e.g., perpendicular direction) relative to the interior surface 230 of the outer wall 110.

Figure 10:
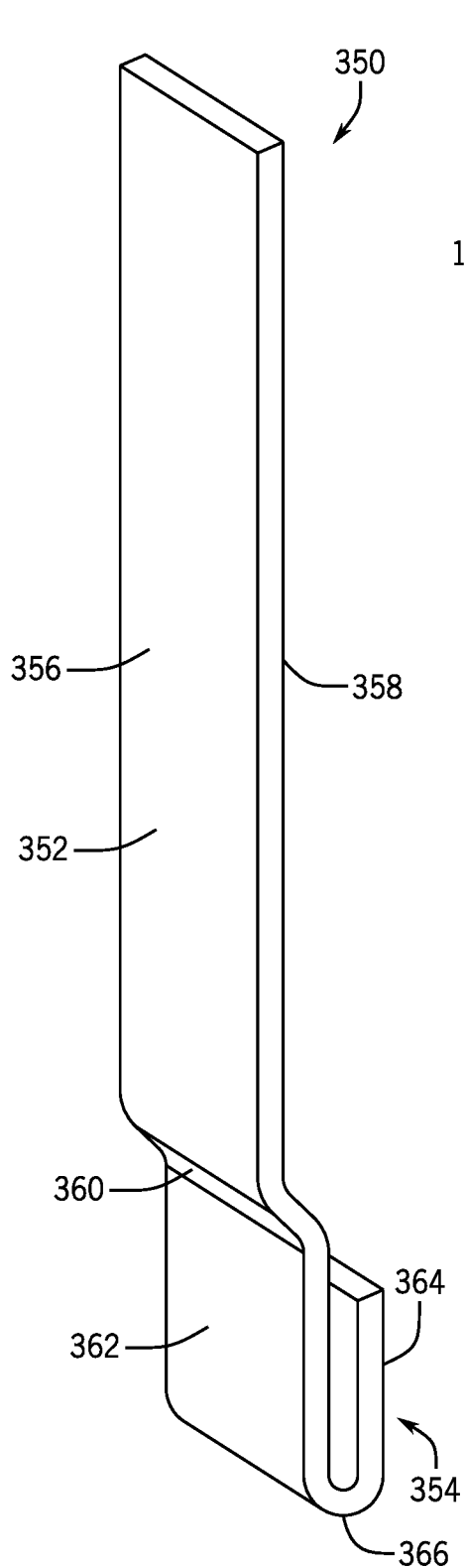
FIG. 10 is a perspective view of an embodiment of an insulation mounting clip configured to hold insulation against the insulation cover plate, such as along a leading edge or trailing edge of the aerodynamic housing of FIGS. 2 and 3.

FIG. 10 is a perspective view of an embodiment of an insulation mounting clip 350 configured to hold insulation 190 against the insulation cover plate 204, such as along a leading edge 166 or trailing edge 168 of the aerodynamic housing 112 of FIGS. 2 and 3. The insulation mounting clip 350 includes an elongated insulation holder or arm 352 extending from or coupled to a U-shaped clip 354. The elongated insulation holder 352 may include an elongated flat plate, such as a rectangular plate having opposite parallel face surfaces 356 and 358. The elongated insulation holder 352 may be coupled to the U-shaped clip 354 via an intermediate bend portion 360, which may be used to adjust a thickness for accommodating the insulation 190 as discussed in further detail below. The U-shaped clip 354 may include opposite walls 362 and 364 spaced apart from one another and coupled together via a bend portion 366. For example, the walls 362 and 364 may be parallel rectangular walls, such as rectangular plate portions. The bend portion 366 may be a bent plate portion, which is bent approximately 180 degrees between the walls 362 and 364.

In certain embodiments, the entire insulation mounting clip 350 may be constructed from sheet metal, and thus the entire body of the insulation mounting clip 350 may be a single continuous piece of metal having a uniform thickness. However, in certain embodiments, the insulation mounting clip 350 may be constructed from multiple pieces, the thickness may be uniform or varying, and the materials may be uniform or varying. The U-shaped clip 354 is configured to mount the insulation mounting clip 350 to the insulation cover plate 204, while the elongated insulation holder 352 is configured to hold the insulation 190 against the insulation cover plate 204. In certain embodiments, the insulation mounting clip 350 may be used at the leading edge 166 and/or the trailing edge 168 of the outer wall 110 as illustrated in FIG. 3.

Figure 11:
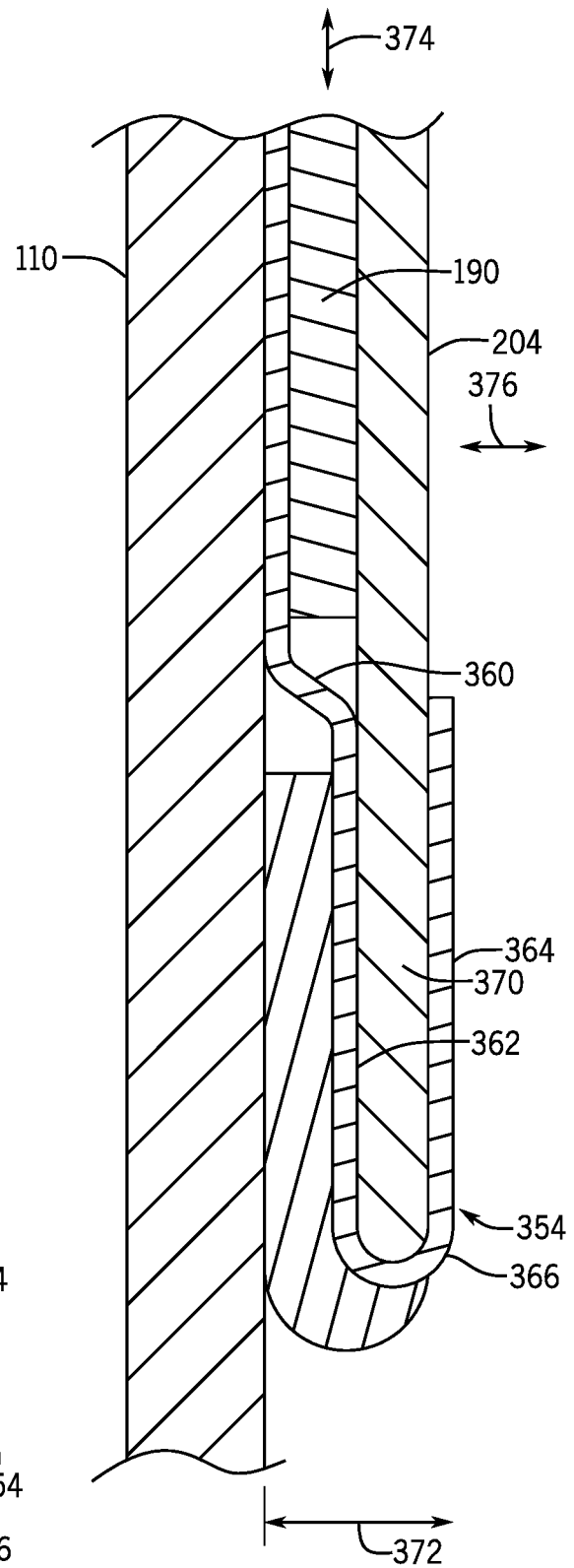
FIG. 11 is a partial cross-sectional view of an embodiment of the radial structure of FIGS. 1-4, further illustrating the insulation assembly having the insulation held against the insulation cover plate via the insulation mounting clip of FIG. 10.

FIG. 11 is a partial cross-sectional view of an embodiment of the radial structure 80 of FIGS. 1-4, further illustrating the insulation assembly 140 having the insulation 190 held against the insulation cover plate 204 via the insulation mounting clip 350 of FIG. 10. In the illustrated embodiment, the insulation mounting clip 350 is depicted at the leading edge 166 or the trailing edge 168 of the radial structure 80; however, the insulation mounting clip 350 may be disposed at any location of the radial structure 80 to hold the insulation 190 against the insulation cover plate 204. As illustrated, the U-shaped clip 354 wraps around a peripheral portion or edge 370 of the insulation cover plate 204, while the bend portion 360 adjusts the height of the elongated insulation holder 352 to accommodate the insulation 190.

The elongated insulation holder 352 extends lengthwise along the insulation 190 and may compress the insulation 190 against the insulation cover plate 204. Accordingly, the insulation mounting clip 350 retains the insulation 190 with the insulation cover plate 204, such that any movement of the insulation cover plate 204 relative to the outer wall 110 will allow the insulation 190 to move along with the insulation cover plate 204. As indicated by arrow 372, the insulation cover plate 204 along with the insulation mounting clip 350 and the insulation 190 may move toward or away from the outer wall 110 during thermal expansion and contraction of the radial structure 80. Accordingly, the insulation mounting clip 350 retains the insulation 190 to the insulation cover plate 204 rather than to the outer wall 110. Additionally, the insulation 190 may be free to move laterally relative to the insulation cover plate 204 and the insulation mounting clip 350 as indicated by arrows 374, while the insulation 190 is not able to move in a perpendicular direction as indicated by arrow 376.

Technical effects of the disclosed embodiments include an insulation assembly for a component of an exhaust diffuser, wherein the insulation assembly includes an insulation mount assembly configured to accommodate thermal expansion and contraction due to an exhaust gas passing through the exhaust diffuser. In particular, the insulation mount assembly includes an insulation cover plate secured by a plurality of mounting clips over insulation along a surface of a wall of the exhaust diffuser, such as within an interior of a radial structure (e.g., airfoil). The mounting clips block perpendicular movement and allow parallel movement of the insulation cover plate relative to the wall, such that the insulation cover plate maintains a position of the insulation against the wall while accommodating thermal expansion and contraction. The mounting clips may be disposed along edges and/or interior portions of the insulation cover plate.

The subject matter described in detail above may be defined by one or more clauses, as set forth below.

A system may include an insulation mount assembly configured to mount insulation within a component of an exhaust diffuser of a combustion system. The insulation mount assembly includes an insulation cover plate configured to cover the insulation over a wall of the component, and a plurality of mounting clips configured to extend partially over the insulation plate and couple to the wall of the component. Each clip of the plurality of mounting clips is configured to enable movement of the insulation cover plate in a first direction along a surface of the wall and block movement of the insulation cover plate in a second direction crosswise to the surface of the wall.

The system of the preceding clause, including an insulation assembly having the insulation covered by the insulation cover plate of the insulation mount assembly.

The system of any preceding clause, including the component of the exhaust diffuser having the insulation assembly.

The system of any preceding clause, including the exhaust diffuser having a plurality of radial structures extending between a central hub and an outer casing, wherein the plurality of radial structures are disposed along an exhaust flow path between the central hub and the outer casing.

The system of any preceding clause, including a gas turbine system having the exhaust diffuser downstream of a turbine section.

The system of any preceding clause, wherein the component includes a radial structure having the wall disposed about a cavity, the surface is an interior surface of the wall, and the insulation assembly is disposed within the cavity along the interior surface.

The system of any preceding clause, wherein the radial structure includes an airfoil shaped housing having the wall disposed about a strut, and a cooling flow path is disposed between the interior surface of the wall and the strut.

The system of any preceding clause, wherein the plurality of mounting clips are fixed to the wall of the airfoil shaped housing, and the plurality of mounting clips extend partially over the insulation cover plate at one or more edges and/or interior portions of the insulation cover plate.

The system of any preceding clause, wherein at least one mounting clip of the plurality of mounting clips is configured to mount along an edge of the insulation cover plate.

The system of any preceding clause, wherein the at least one mounting clip is configured to mount in a recess along the edge of the insulation cover plate.

The system of any preceding clause, wherein the at least one mounting clip includes an enlarged head coupled to a body having a planar surface disposed along the insulation cover plate, wherein the enlarged head includes a tapered portion configured to be welded to the wall.

The system of any preceding clause, wherein the insulation cover plate includes an enlarged border along the edge, and the enlarged border includes a spacer portion configured to define a spacing for the insulation between the wall and the insulation cover plate.

The system of any preceding clause, wherein at least one mounting clip of the plurality of mounting clips is configured to mount in an interior portion of the insulation cover plate, wherein the at least one mounting clip includes a head disposed at least partially over the insulation cover plate and a shaft extending through openings in the insulation cover plate, the insulation, and the wall, wherein the shaft is coupled to the wall at a joint.

The system of any preceding clause, including a spacer portion disposed about the shaft of the at least one mounting clip, wherein the spacer portion is configured to define a spacing for the insulation between the wall and the insulation cover plate.

The system of any preceding clause, including an insulation mounting clip having an insulation holder coupled to a U-shaped clip, wherein the U-shaped clip is configured to couple to the insulation cover plate and the insulation holder is configured to hold the insulation against the insulation cover plate.

A system may include an exhaust diffuser having a central hub, an exhaust flow path disposed about the central hub, an outer wall disposed about the exhaust flow path, and a plurality of radial structures extending between the central hub and the outer wall. Each radial structure of the plurality of radial structures may include a wall disposed about a cavity, an insulation layer disposed over an interior surface of the wall, an insulation cover plate disposed over the insulation layer, and a plurality of mounting clips coupled to the wall. Each clip of the plurality of mounting clips enables movement of the insulation cover plate in a first direction along the interior surface and blocks movement of the insulation cover plate in a second direction crosswise to the interior surface.

The system of the preceding clause, wherein the plurality of mounting clips are welded to the wall.

The system of any preceding clause, wherein the plurality of mounting clips include one or more mounting clips disposed at an edge of the insulation cover plate, one or more mounting clips at an interior portion of the insulation cover plate, or a combination thereof.

The system of any preceding clause, wherein the wall defines an airfoil shaped housing disposed about the cavity, the airfoil shaped housing comprises an upstream section coupled to a downstream section at joints, and the insulation cover plate includes cover plate portions in the upstream and downstream sections mounted via the plurality of mounting clips.

A method may include positioning an insulation cover plate to cover an insulation layer over a wall of a component of an exhaust diffuser of a combustion system, and extending a plurality of mounting clips partially over the insulation cover plate. The method may also include coupling the plurality of mounting clips to the wall of the component. Each clip of the plurality of mounting clips is configured to enable movement of the insulation cover plate in a first direction along a surface of the wall and block movement of the insulation cover plate in a second direction crosswise to the surface of the wall.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 an insulation mount assembly configured to mount an insulation within a cavity of a radial structure of an exhaust diffuser of a combustion system, wherein the insulation mount assembly comprises:
  an insulation cover plate configured to cover the insulation over an interior surface of a wall of the radial structure; and
  a plurality of mounting clips configured to extend partially over the insulation cover plate and couple to the wall of the radial structure, wherein each clip of the plurality of mounting clips is configured to enable movement of the insulation cover plate in a first direction along the interior surface of the wall and block movement of the insulation cover plate in a second direction crosswise to the interior surface of the wall, and the insulation cover plate includes a plurality of cover plate portions configured to be separately mounted over different portions of the interior surface via the plurality of mounting clips.

2. The system of claim 1, comprising an insulation assembly having the insulation covered by the insulation cover plate of the insulation mount assembly.

3. The system of claim 2, comprising the radial structure of the exhaust diffuser having the insulation assembly.

4. The system of claim 3, comprising the exhaust diffuser having a plurality of radial structures extending between a central hub and an outer casing, wherein the plurality of radial structures is disposed along an exhaust flow path between the central hub and the outer casing, and the plurality of radial structures includes the radial structure.

5. The system of claim 4, comprising a gas turbine system having the exhaust diffuser downstream of a turbine section.

6. The system of claim 1, wherein the plurality of cover plate portions are configured to mount in upstream and downstream sections of the radial structure along an exhaust flow path through the exhaust diffuser via the plurality of mounting clips, and the different portions of the interior surface comprise respective upstream and downstream portions of the interior surface.

7. The system of claim 1, wherein the radial structure comprises an airfoil shaped housing having the wall disposed about a strut, and a cooling flow path is disposed between the interior surface of the wall and the strut.

8. The system of claim 7, wherein the plurality of mounting clips is fixed to the wall of the airfoil shaped housing, the plurality of mounting clips extends partially over the insulation cover plate at one or more edges and at one or more interior portions of the insulation cover plate, and the one or more interior portions are offset away from all edges of the insulation cover plate.

9. The system of claim 1, wherein at least one mounting clip of the plurality of mounting clips is configured to mount along an edge of the insulation cover plate.

10. The system of claim 9, wherein the at least one mounting clip is configured to mount in a recess in the insulation cover plate, and the recess is disposed directly along the edge of the insulation cover plate.

11. The system of claim 9, wherein the plurality of mounting clips are configured to mount along the edge of the insulation cover plate at a radially inner edge, a radially outer edge, and a radially extending edge between the radially inner edge and the radially outer edge of the insulation cover plate.

12. The system of claim 9, wherein the insulation cover plate comprises an enlarged border along the edge, and the enlarged border comprises a spacer portion configured to define a spacing for the insulation between the wall and the insulation cover plate.

13. The system of claim 1, wherein at least one mounting clip of the plurality of mounting clips is configured to mount in an interior portion of the insulation cover plate offset away from edges of the insulation cover plate, wherein the at least one mounting clip comprises a head disposed at least partially over the insulation cover plate and a shaft extending through openings in the insulation cover plate, the insulation, and the wall, wherein the shaft is coupled to the wall at a joint.

14. The system of claim 13, comprising a spacer portion disposed about the shaft of the at least one mounting clip, wherein the spacer portion is configured to define a spacing for the insulation between the wall and the insulation cover plate.

15. The system of claim 1, comprising an insulation mounting clip having an insulation holder coupled to a U-shaped clip, wherein the U-shaped clip is configured to couple to the insulation cover plate and the insulation holder is configured to hold the insulation against the insulation cover plate.

16. A system, comprising:
an exhaust diffuser, comprising:
a central hub;
an exhaust flow path disposed about the central hub;
an outer wall disposed about the exhaust flow path;
a plurality of radial structures extending between the central hub and the outer wall, wherein each radial structure of the plurality of radial structures comprises:
a wall disposed about a cavity;
an insulation layer disposed over an interior surface of the wall;
an insulation cover plate disposed over the insulation layer; and
a plurality of mounting clips coupled to the wall, wherein each clip of the plurality of mounting clips enables movement of the insulation cover plate in a first direction along the interior surface and blocks movement of the insulation cover plate in a second direction crosswise to the interior surface, and the insulation cover plate includes a plurality of cover plate portions separately mounted over different portions of the interior surface via the plurality of mounting clips.

17. The system of claim 16, wherein the plurality of mounting clips is welded to the wall.

18. The system of claim 16, wherein the plurality of mounting clips includes one or more mounting clips disposed at an edge of the insulation cover plate, one or more mounting clips at an interior portion of the insulation cover plate offset away from all edges of the insulation cover plate, or a combination thereof.

19. The system of claim 16, wherein the wall defines an airfoil shaped housing disposed about the cavity, the airfoil shaped housing comprises an upstream section coupled to a downstream section at joints, and the plurality of cover plate portions are mounted in the upstream and downstream sections via the plurality of mounting clips.

20. A method, comprising:
positioning a plurality of cover plate portions of an insulation cover plate to cover an insulation layer over different portions of an interior surface of a wall of a radial structure of an exhaust diffuser of a combustion system;
extending a plurality of mounting clips partially over the plurality of cover plate portions of the insulation cover plate; and
coupling the plurality of mounting clips to the wall of the component, wherein each clip of the plurality of mounting clips is configured to enable movement of the insulation cover plate in a first direction along the interior surface of the wall and block movement of the insulation cover plate in a second direction crosswise to the interior surface of the wall.

* * * * *